United States Patent
Esrail

(10) Patent No.: US 10,129,512 B2
(45) Date of Patent: Nov. 13, 2018

(54) SELF-ADJUSTING PORTABLE MODULAR 360-DEGREE PROJECTION AND RECORDING COMPUTER SYSTEM

(71) Applicant: Rabin Esrail, Beverly Hills, CA (US)

(72) Inventor: Rabin Esrail, Beverly Hills, CA (US)

(*) Notice: Subject to any disclaimer, the term of this patent is extended or adjusted under 35 U.S.C. 154(b) by 0 days.

(21) Appl. No.: 15/992,566

(22) Filed: May 30, 2018

(65) Prior Publication Data

US 2018/0278904 A1 Sep. 27, 2018

Related U.S. Application Data

(63) Continuation of application No. 15/344,134, filed on Nov. 4, 2016.

(51) Int. Cl.
*H04N 9/31* (2006.01)
*H04N 5/232* (2006.01)

(52) U.S. Cl.
CPC ....... *H04N 9/3185* (2013.01); *H04N 5/23238* (2013.01); *H04N 9/3141* (2013.01); *H04N 9/3147* (2013.01); *H04N 9/3194* (2013.01)

(58) Field of Classification Search
CPC .................................................. H04N 9/3185
See application file for complete search history.

(56) References Cited

U.S. PATENT DOCUMENTS

| | | | |
|---|---|---|---|
| 7,686,457 B2 * | 3/2010 | Kobayashi | G03B 21/26 353/30 |
| 8,550,635 B2 * | 10/2013 | Kotani | G03B 21/14 348/745 |
| 9,225,950 B2 * | 12/2015 | Lee | H04N 9/3194 |
| 9,532,018 B2 * | 12/2016 | Ishikawa | G06T 3/005 |
| 9,930,307 B1 * | 3/2018 | Kursula | H04N 17/002 |
| 2006/0181685 A1 * | 8/2006 | Hasegawa | G03B 37/04 353/69 |
| 2007/0115361 A1 * | 5/2007 | Bolas | H04N 5/74 348/189 |
| 2008/0055554 A1 * | 3/2008 | Tubin | G03B 21/26 353/30 |
| 2008/0259223 A1 * | 10/2008 | Read | H04N 9/3147 348/745 |
| 2011/0211065 A1 * | 9/2011 | Furui | G03B 21/14 348/135 |

(Continued)

*Primary Examiner* — James M Pontius
(74) *Attorney, Agent, or Firm* — Chen Huang; Adli Law Group P.C.

(57) ABSTRACT

The present disclosure relates to an innovative projection system that comprises a camera that records images and videos, and sends the recorded images and videos to a computing device, a projector that projects output images or videos received from the computing device, a rechargeable battery that provides power to the camera and the projector and a communication unit that establishes connections between the camera, the projector and the computing device. The projection system has at least one motor that rotates the camera and the projector in at least one axial direction, where the camera rotates and searches for images and videos projected by another projector, and the projector then projects images and videos adjacent to or on top of the images and videos projected by another projector, or projects images and videos that merge with the images and videos projected by another projector.

20 Claims, 11 Drawing Sheets

(56) References Cited

U.S. PATENT DOCUMENTS

| | | | |
|---|---|---|---|
| 2011/0228104 A1* | 9/2011 | Nelson | H04N 9/3147 348/190 |
| 2012/0154663 A1* | 6/2012 | Park | G03B 17/54 348/333.06 |
| 2013/0093805 A1* | 4/2013 | Iversen | H04N 9/31 345/690 |
| 2014/0104582 A1* | 4/2014 | Mori | H04N 9/3185 353/30 |
| 2014/0368614 A1* | 12/2014 | Imai | G01B 21/047 348/47 |
| 2015/0221093 A1* | 8/2015 | Sagawa | G01B 11/2513 345/419 |
| 2016/0173842 A1* | 6/2016 | De La Cruz | G03B 21/147 353/70 |
| 2016/0182903 A1* | 6/2016 | Grundhofer | G06T 7/80 348/187 |
| 2016/0200161 A1* | 7/2016 | Van Den Bossche | G01S 17/46 701/28 |
| 2017/0140791 A1* | 5/2017 | Das | G11B 27/036 |
| 2017/0254637 A1* | 9/2017 | Nakano | G01B 11/00 |
| 2018/0005397 A1* | 1/2018 | Tsai | G06T 7/80 |
| 2018/0278840 A1* | 9/2018 | Narikawa | H04N 5/23229 |

* cited by examiner

SELF-ADJUSTING PORTABLE MODULAR 360-DEGREE PROJECTION AND RECORDING COMPUTER SYSTEM

CROSS-REFERENCE TO RELATED PATENT APPLICATIONS

Embodiments of the present invention relate to U.S. Non-Provisional application Ser. No. 15/344,134, filed Nov. 4, 2016, entitled "SELF ADJUSTING PORTABLE MODULAR PROJECTION AND RECORDING COMPUTER SYSTEM", the contents of which are incorporated by reference herein in their entirety and which are basis for the claim of priority.

FIELD OF THE INVENTION

The present invention is in the field of projection systems. More specifically, the present disclosure provides a self-adjusting portable projection and recording computer system that can perform up to 360-degree projection, and can rotate and search for images and videos projected by another projector and then projects images and videos that connect or merge with images and videos projected by another projector.

BACKGROUND

A projector is an optical device that projects an image or a video (i.e., moving images) onto a surface such as a projector screen or a wall. Most projectors create an image by shining a light through a small transparent lens, but some newer types of projectors can project the image directly, by using lasers.

Advantages of using a projector over a TV or monitor include, but are not limited to, customized picture size, lower cost and space saving. A projector allows a user to create the very large screen experience of a commercial movie theater in his or her own home. A projector can also be the least expensive alternative for big screen video. While the size of an image projected by a conventional projector, in theory, can go up to hundreds of inches' diagonal, the actual size of any given projector's image is limited by its light output.

Another hurdle faced by the conventional projectors is that a dark room is often required. Projectors look their best in a darkened room because the user can get maximum contrast and sparkle in the picture. Whether a user needs a dark room or not depends in part on how bright the user's projector is, and in part on the user's desire to maintain maximum image quality. In addition, conventional projectors are mostly stationary and projects images only at directions designated/adjusted by a user, thereby their applications are being limited.

Accordingly, there exists a need for an improved projection system that can projects images that connect with images projected by other projectors to increase a projector's applications. There also exists a need for an improved projection system that is self-adjustable to create brighter, larger and customized images.

SUMMARY OF THE DISCLOSURE

The embodiments of the present invention generally relate to a projection system and more specifically a self-adjusting portable projection and recording computer system that can rotate and search for images and videos projected by another projector and then projects images and videos that connect or merge with images and videos projected by another projector.

In accordance with one embodiment of the present disclosure, a projection system is disclosed comprising: 1) a camera that records images and videos, and sends the recorded images and videos to a computing device, 2) a projector that projects output images or videos received from the computing device, 3) a rechargeable battery that provides power to the camera and the projector and 4) a communication unit that establishes connections between the camera, the projector and the computing device. The projection system has at least one motor that rotates the camera and the projector in at least one axial direction, where the camera rotates and searches for images and videos projected by another projector, and the projector then projects images and videos adjacent to or on top of the images and videos projected by another projector, or projects images and videos that merge with the images and videos projected by another projector.

The foregoing and other objects, features and advantages of the present invention are more readily apparent from the detailed description of the preferred embodiments set forth below, taken in conjunction with the accompanying drawings.

DETAILED DESCRIPTION OF PREFERRED EMBODIMENTS

The following description is not to be taken in a limiting sense, but is made merely for the purpose of illustrating the general principles of the invention, since the scope of the invention is best defined by the following claims. Various inventive features are described below that can each be used independently of one another or in combination with other features.

Broadly, embodiments of the present disclosure generally provide a self-adjusting portable projection and recording computer system that can rotate and search for images and videos projected by another projector and then projects images and videos that connect or merge with images and videos projected by another projector.

Figure 1:
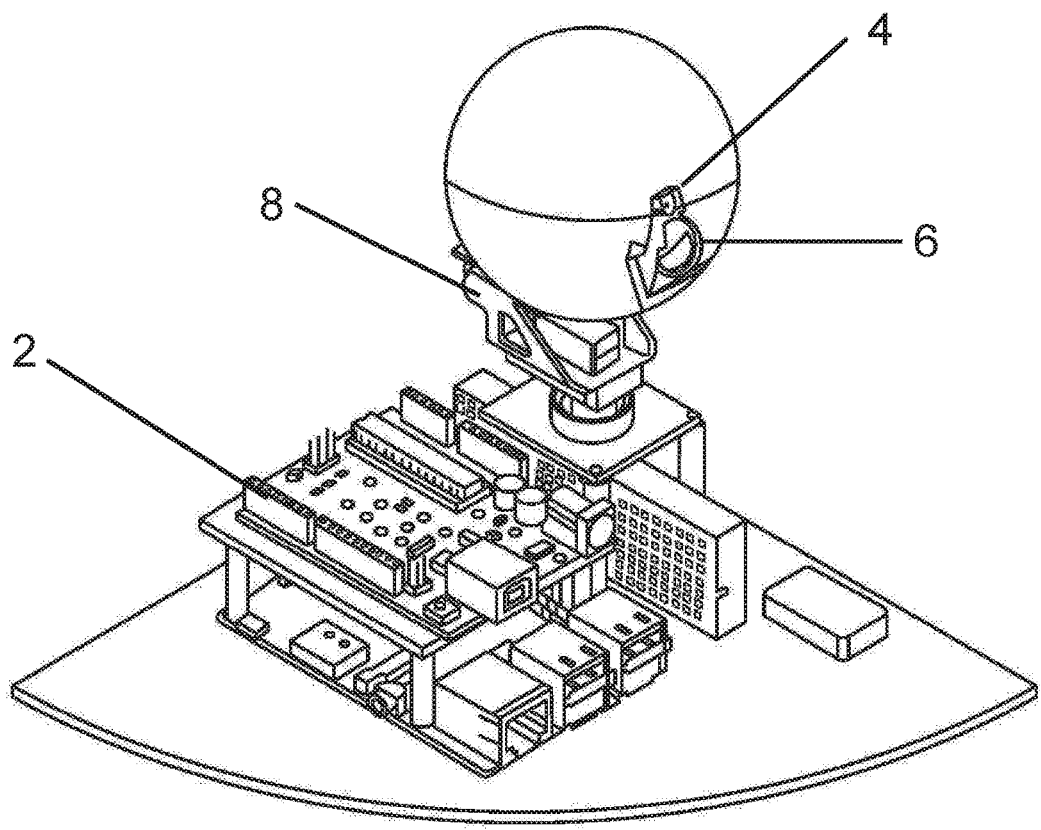
FIG. 1 is a schematic drawing according to an exemplary embodiment of the present invention.

In accordance with one embodiment of the present disclosure, as shown by FIG. 1, a projection system is disclosed comprising: a computing device 2 that has at least a communication unit, a storage unit, a power supply and a processor; a camera 4 that is capable of recording images and videos for the computing device 2, and searching for images and videos projected by another projector; and a projector 6 that projects images or videos output by the computer device 2. The projector 6 and the camera 4 can physically attach to and communicate with the computing device 2 through a socket (e.g., USB) or detached from the computing device and communicate with the computing device 2 wirelessly (e.g., LTE, Wi-Fi and Bluetooth etc.). The disclosed projection system further includes at least one motor 8 that rotates the camera 4 and the projector 6 in at least one axial direction. Preferably, two motors should be used where one rotates horizontally and one rotates vertically, thereby enabling the camera 4 and the projector 6 to rotate in all directions. The motor(s) 8 can be placed or attached directly to the camera 4 and the projector 6, or it can be placed anywhere within the projection system (e.g., bottom of the computing device 2). The computing device 2 may receive inputs and commands from a user via wired or wireless keyboard, mouse, joystick or a combination thereof. The computing device 2 may also include a speaker. The user may also adjust the angles and rotations of the camera 4 and the projector 6 manually if required. The motor 8 allows the camera to take 360-degree images.

Figure 2:
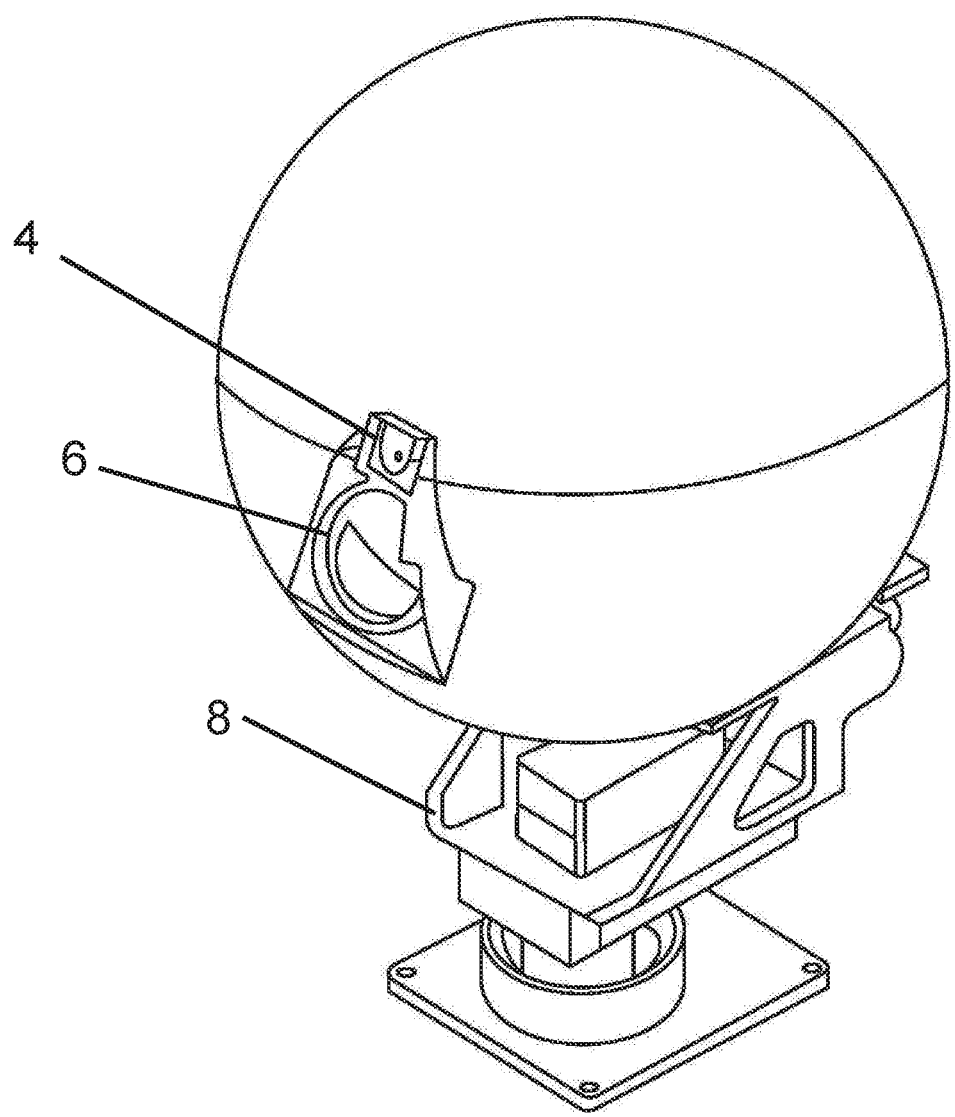
FIG. 2 is a schematic drawing according to an exemplary embodiment of the present invention.

Alternatively, as shown by FIG. 2, the disclosed projection system can be designed in a way without requiring an internal computing device 2. For instance, the disclosed projection system can simply comprise a camera 4 that records images and videos, and sends the recorded images and videos to an external computing device (e.g., a desktop or laptop etc.), a projector 6 that projects output images or videos received from the external computing device. Similarly, the projection system under this configuration will utilize at least one motor 8 that rotates the camera 4 and the projector 6 in at least one axial direction. Preferably, at least two motors should be used so the camera 4 and the projector 6 can rotate in all directions. The motor 8 allows the camera to take 360-degree images as well.

In both settings (with and without internal computing device 2), the camera 4 and the projector 6 are designed and configured in a way that they can physically attach to and detach from the computing device 2 (internal or external) through a socket (e.g., USB). In addition, the camera 4 and the projector 6 further comprises a rechargeable battery that provides power to the camera 4 and the projector 6, and a communication unit that establishes connections between the camera 4, the projector 6 and the computing device 2. The camera 4 and the projector 6 can receive power from the computer device 2 when the camera 4 and projector 6 are attached to the computing device 2, and the camera 4 and the projector 6 can utilize their own power source (i.e., the rechargeable battery) when they are detached from the computing device 2. The rechargeable battery that provides power to the camera 4 and/or the projector 6 can be recharged through the power provided by the computing device 2 while the camera 4 and the projector 6 is physically attached to the computing device 2.

Figure 3:
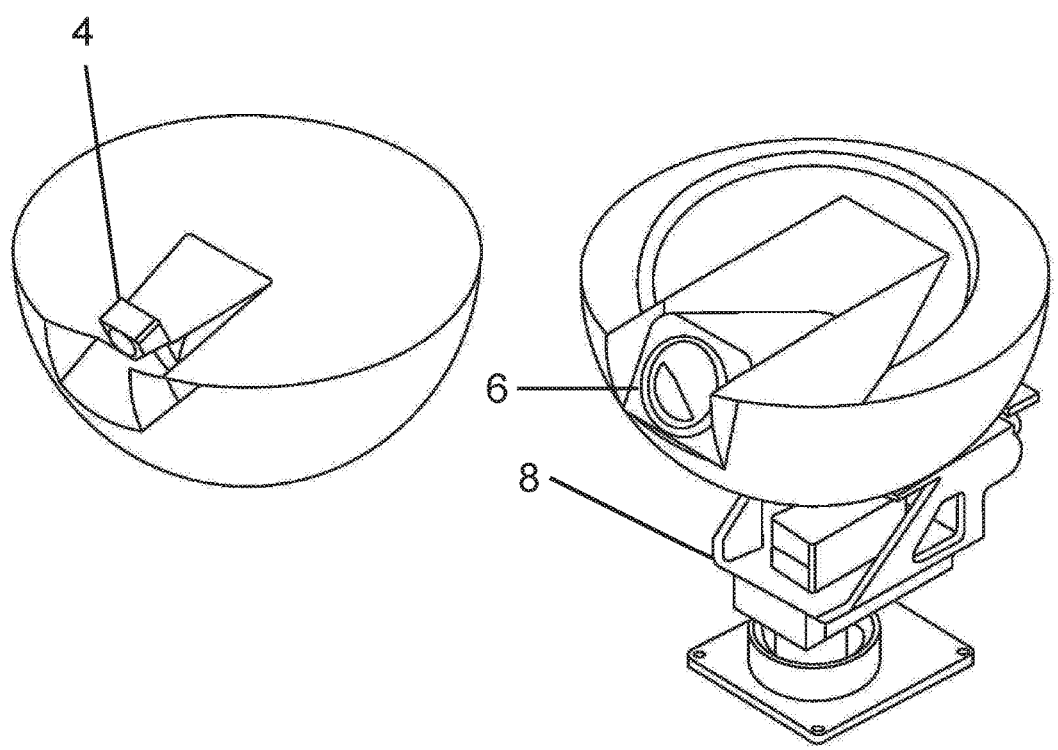
FIG. 3 is a schematic drawing according to an exemplary embodiment of the present invention.

In one embodiment of the present disclosure, as shown by FIG. 2 and FIG. 3, the camera 4 can be attached to the projector 6 and forms a customized shape such as spherical shape, and is detachable from the projector 6 so that the user can simply remove the camera 4 and use it independently for photographing and recording. The camera 4 will have its own power source (e.g., rechargeable battery) and communication units (e.g., Bluetooth, Wi-Fi etc.) that communicates with the projector 6 and/or the computing device 2. Preferably, a physical connection (e.g., a socket) exists between the camera 4 and the projector 6 as well so that when the camera 4 is attached to the projector 6, the battery within the camera 4 can be recharged through the physical connection (the power source may come from the computing device 2). Alternatively, battery within camera 4 can also be charged directly, such as through a power adapter connecting to the camera 4. Optionally, the camera 4 may further comprise a storage unit that stores images or videos taken by the camera 4 and the images or videos taken will automatically uploaded to the computing device 2 once a connection is established between the camera 4 and the computing device 2, either through wire or wirelessly.

Figure 4:
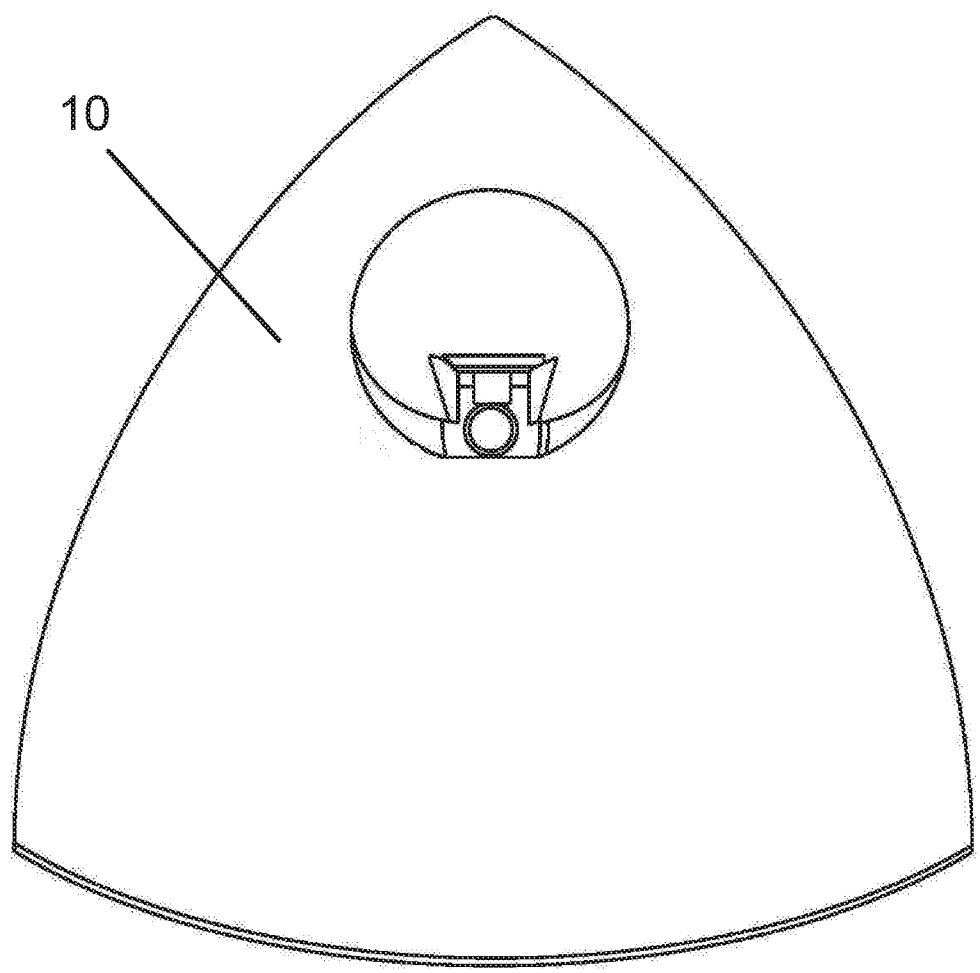
FIG. 4 is a schematic drawing according to an exemplary embodiment of the present invention.
Figure 5:
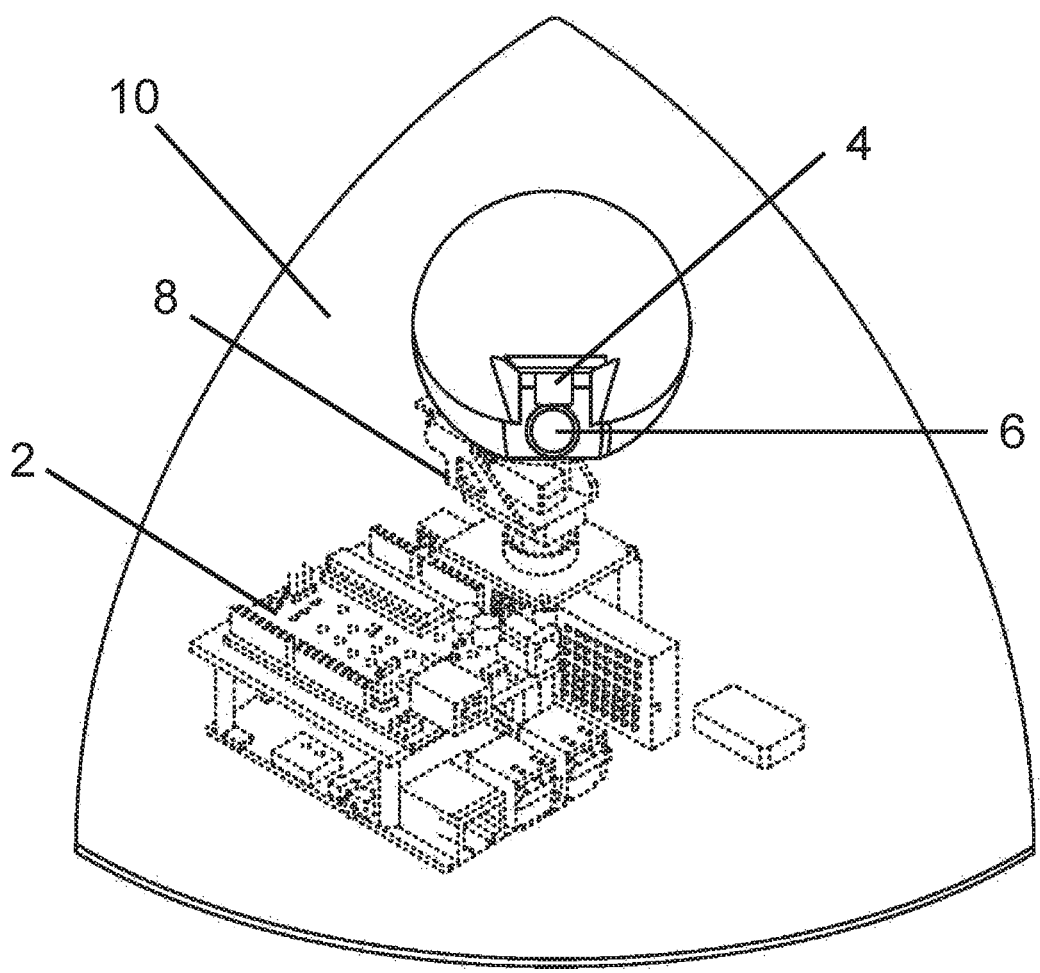
FIG. 5 is a schematic drawing according to an exemplary embodiment of the present invention.

In yet another embodiment of the present disclosure, as shown by FIG. 4 and FIG. 5, the disclosed projection system further comprises a casing 10 the encloses the computing device 2 and/or holds the camera 4 and the projector 6.

Figure 6:
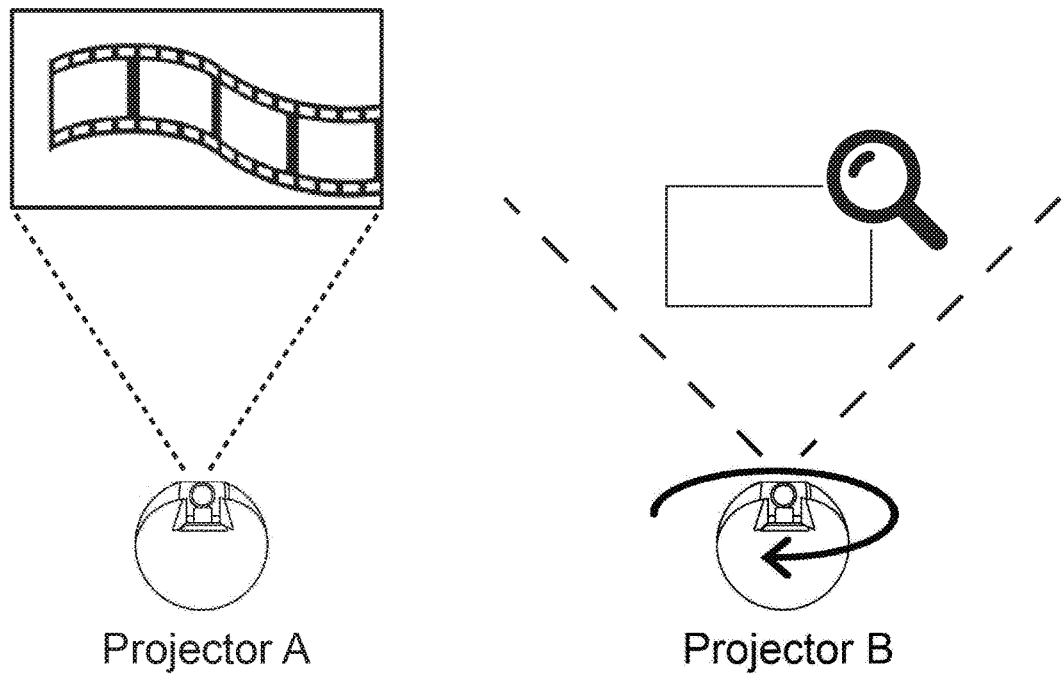
FIG. 6 is a schematic drawing according to an exemplary embodiment of the present invention.
Figure 6:
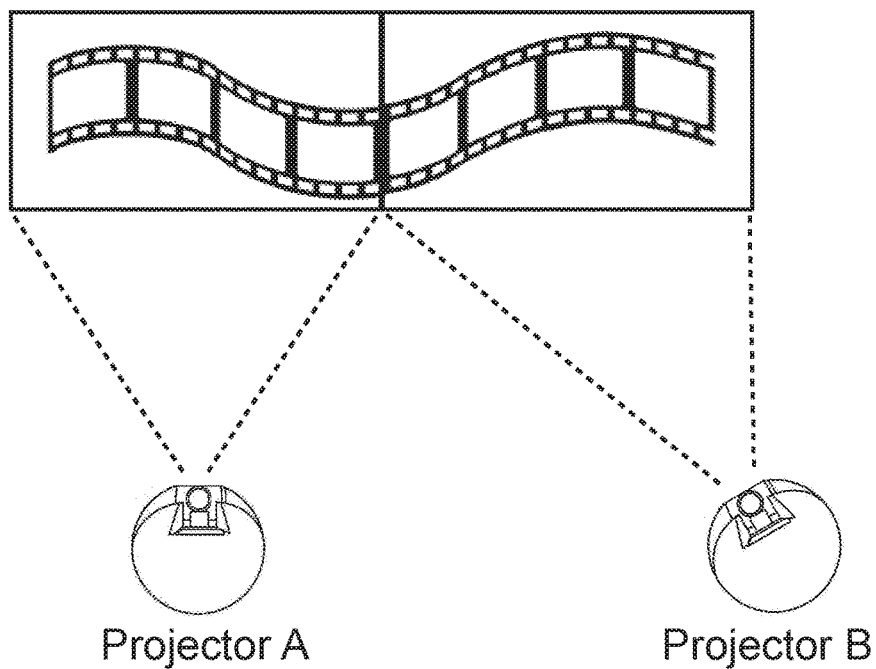
Figure 10:
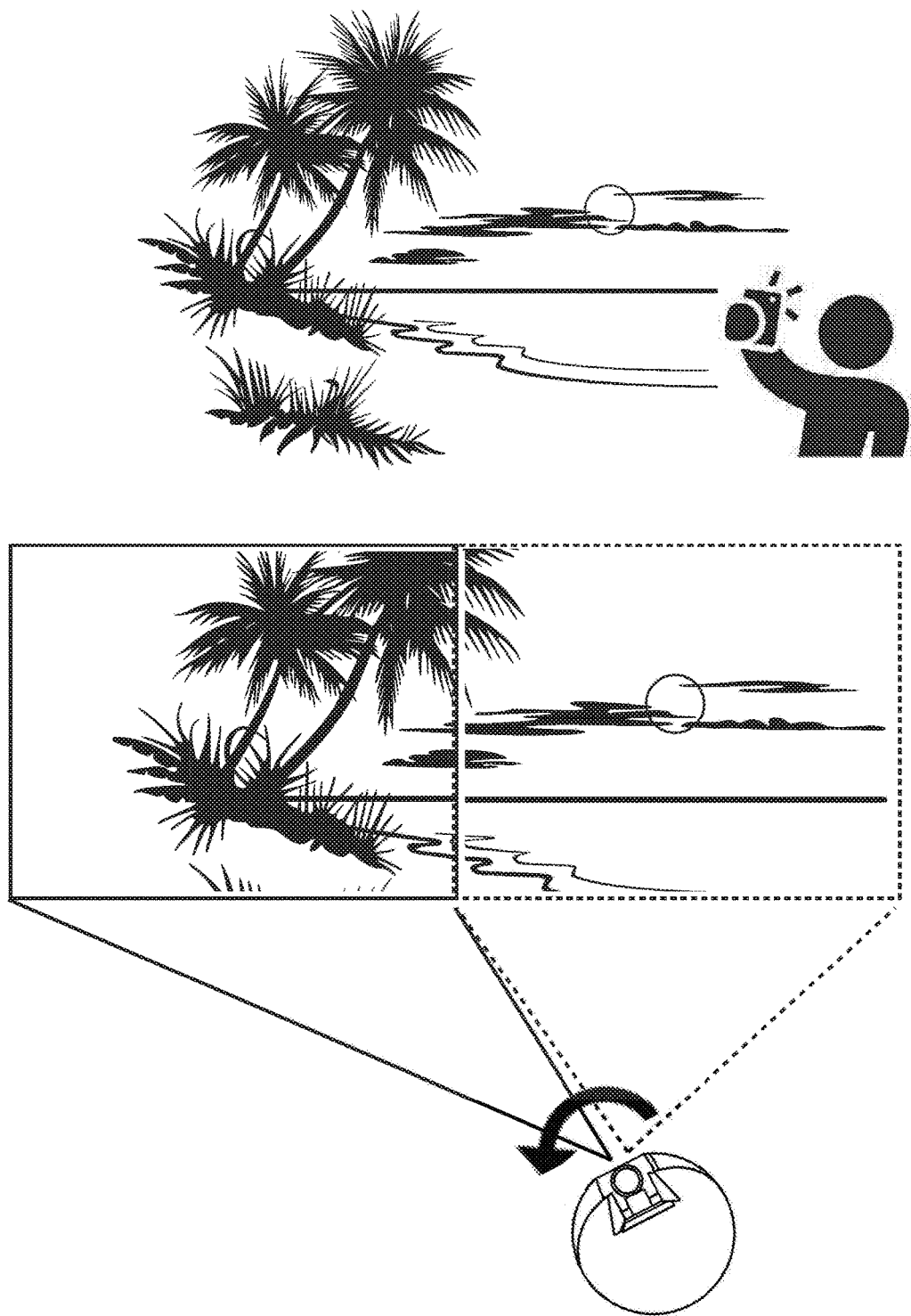
FIG. 10 is a schematic drawing according to an exemplary embodiment of the present invention.
Figure 11:
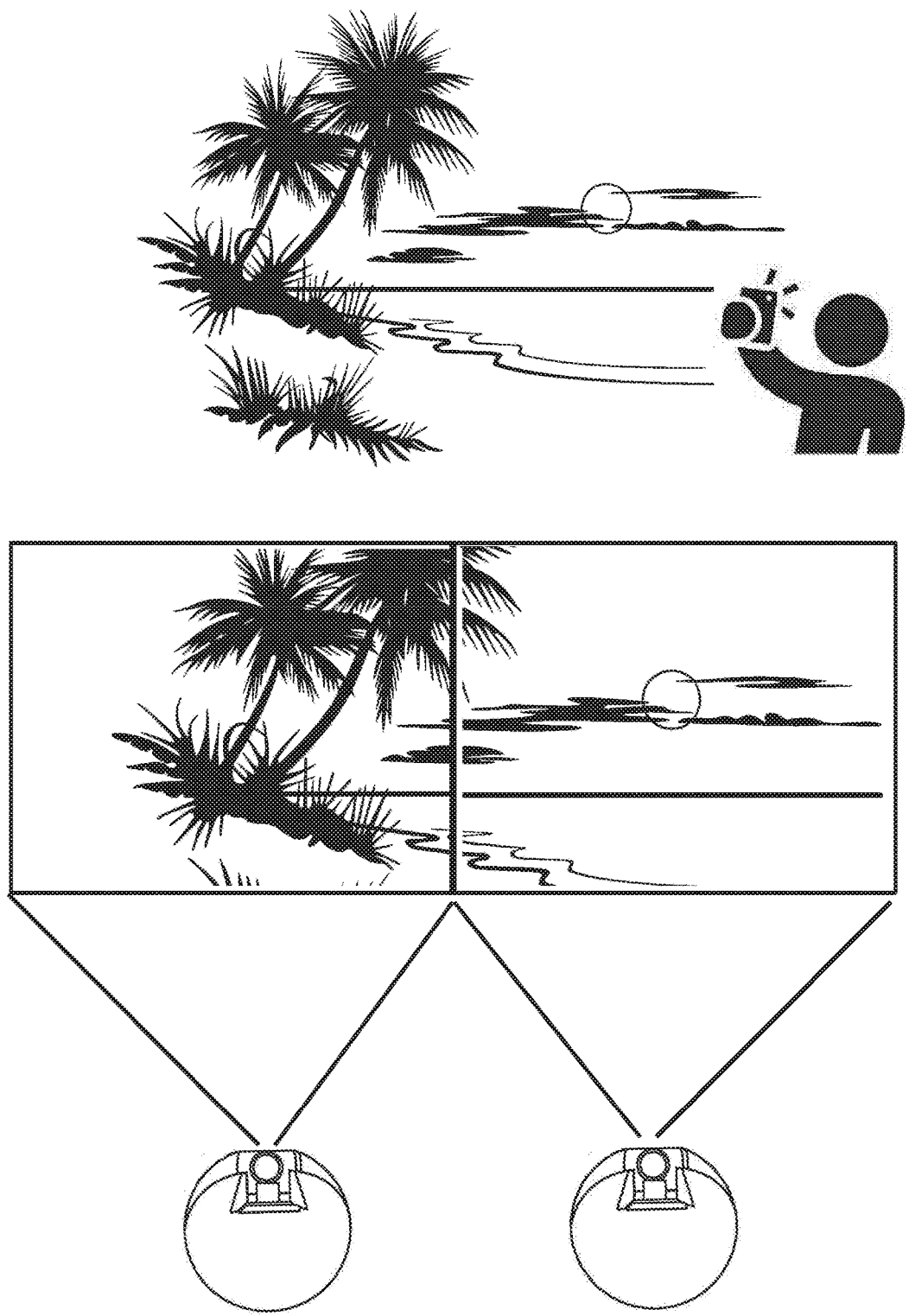
FIG. 11 is a schematic drawing according to an exemplary embodiment of the present invention.

In yet another embodiment of the present disclosure, as shown by FIG. 6, the disclosed projection system is configured or programmed in a way that the camera 4, upon receiving commands from a user or automatically, rotates and searches for images and videos projected by another projector (e.g., likely an identical projection system), and the projector 6 then projects images and videos adjacent to or on top of the images and videos projected by another projector, or projects images and videos that merge with the images and videos projected by another projector. To achieve this, the computing device 2 of the disclosed projection system will be configured or programmed to have access to the image and video database of another projector, and may also have control over another projector. If another projector also has its own computing device, the computing device 2 will be in communication with another projector's computing device. Thus, if a user uses multiple projection systems of the present disclosure and configures each projection system to communicate with each other (through cable or wirelessly), a user can have a variety of ways to creatively display images and videos. A user may display a 360-degree photo or video in his or her room, or projects live images or videos captured from a camera of another projection system in a space to recreate the scenery captured by the camera of another projection system in same orientation. For example, as shown by FIG. 10, a user is taking a 360-degree photo or video of a scenery and the photo and video is then transmitted to the disclosed projection system in another location, allowing the projector of the projection system to project the same scenery in another space (the transmission can be live or stored). The scenery can be displayed by one projector or multiple projectors as shown by FIG. 11. Multiple projectors allow a user to re-create up to 360-degree scenery in the space such as his or her room.

While the schematic drawings in FIG. 6 to FIG. 11 use the image of projector without showing the computing device 2 and/or the casing 10, it should be noted that the computing device 2 and the casing 10 can be included as well depending on how the user wants to setup his or her projection system. For example, the user can simply use the projector(s) wirelessly such that the projector(s) does not need to be in physical contact with the computing device 2 and/or the casing 10. In another embodiment, the user use the whole system as shown by FIG. 4 and FIG. 5 (with computing device 2 and the casing 10 attached). As such, the projector image in FIG. 6 to FIG. 11 can refer to the whole projection system or just the projector from the projection system. Both designs and their variations are covered by the present disclosure.

Figure 7:
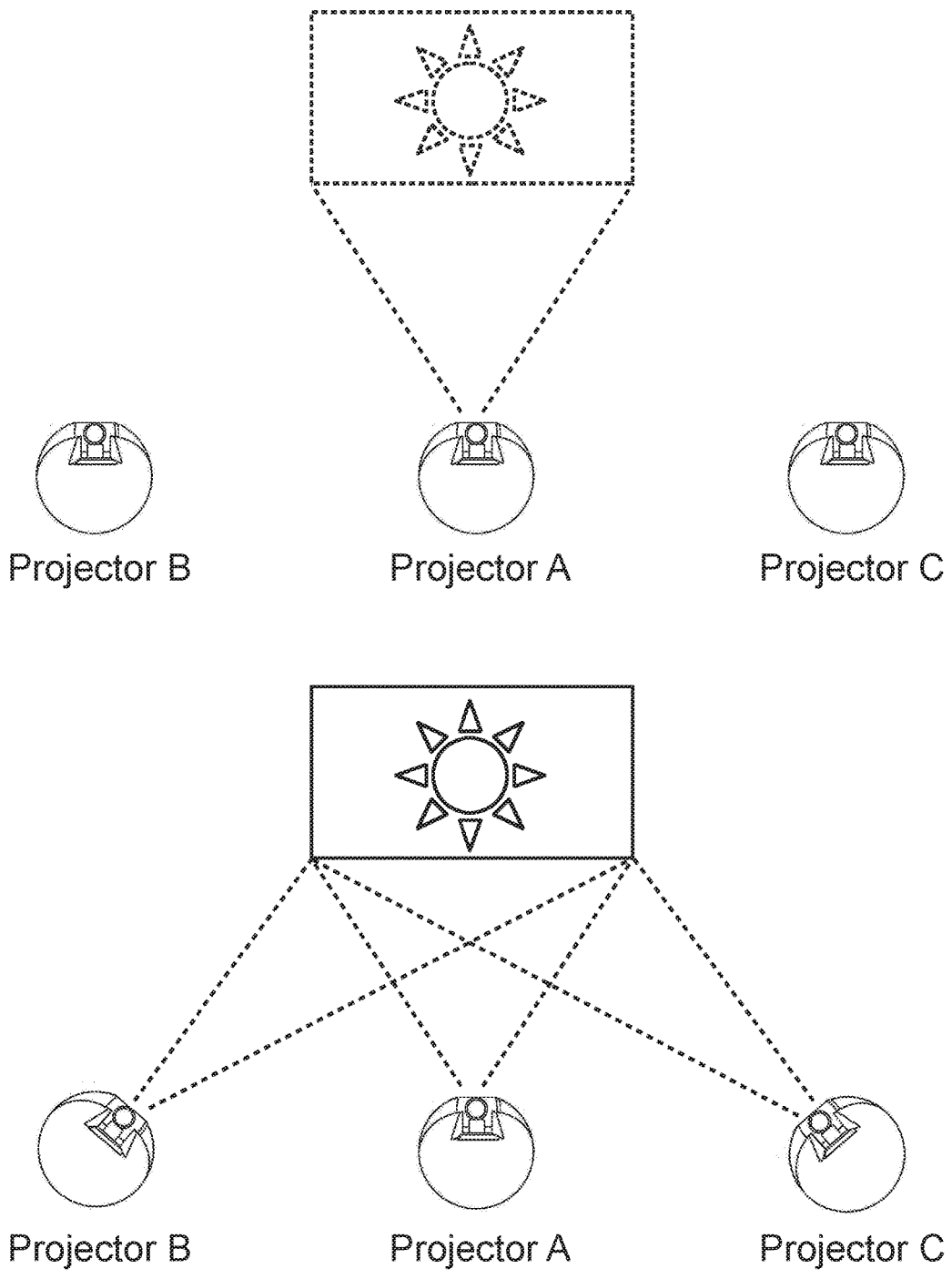
FIG. 7 is a schematic drawing according to an exemplary embodiment of the present invention.

In yet another embodiment of the present disclosure, as shown by FIG. 7, the camera 4 can be configured or programmed to track images or videos projected by another projector, and then projects identical images or videos on top of the images or videos projected by another projector to enhance brightness or contrast of the images or videos projected by another projector, thereby increasing the brightness and contrast of an image or video without increasing the light output of the projector. Similarly, to achieve this, the computing device 2 of the disclosed projection system will have access to the image and video database of another projector, and may also have control over another projector.

Figure 8:
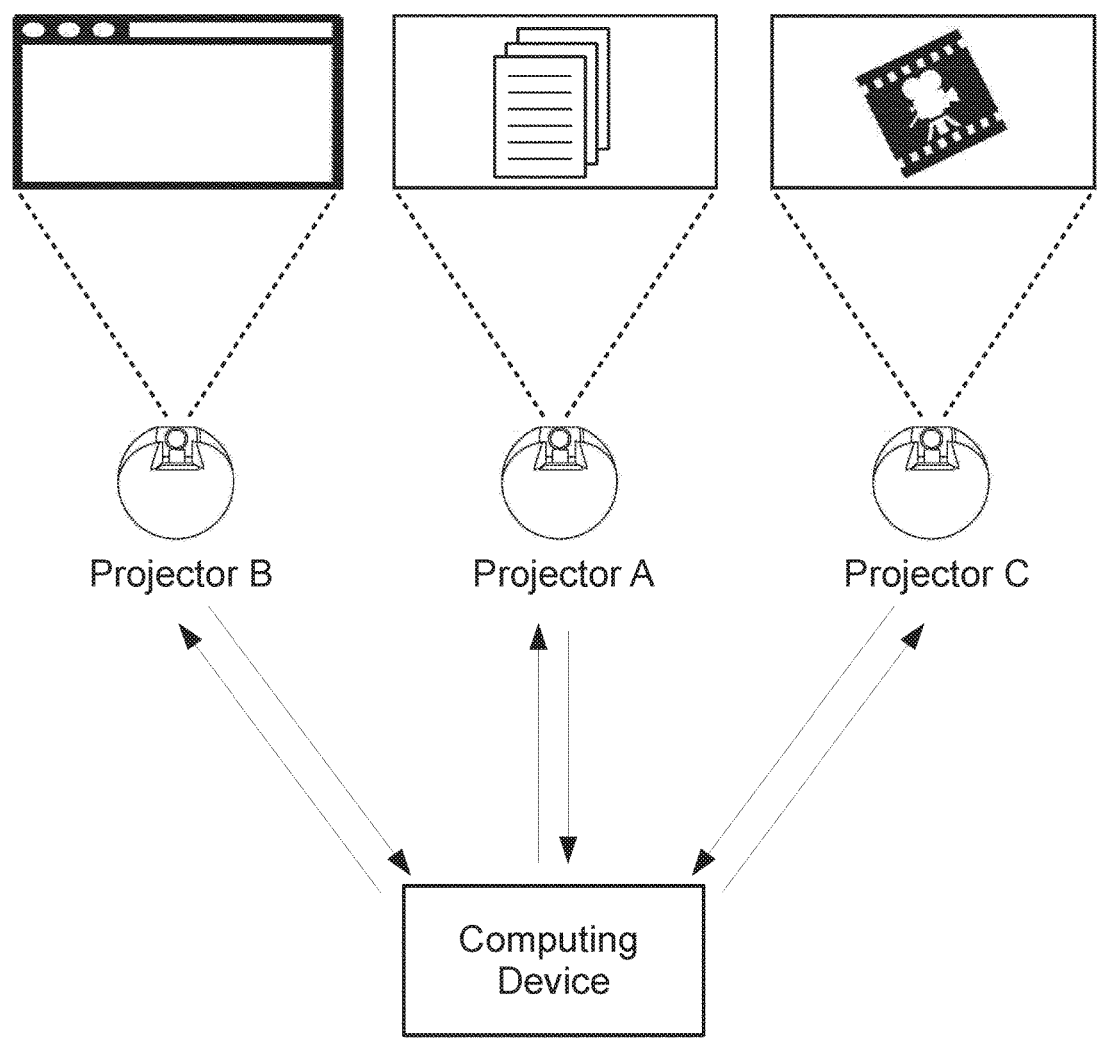
FIG. 8 is a schematic drawing according to an exemplary embodiment of the present invention.
Figure 9:
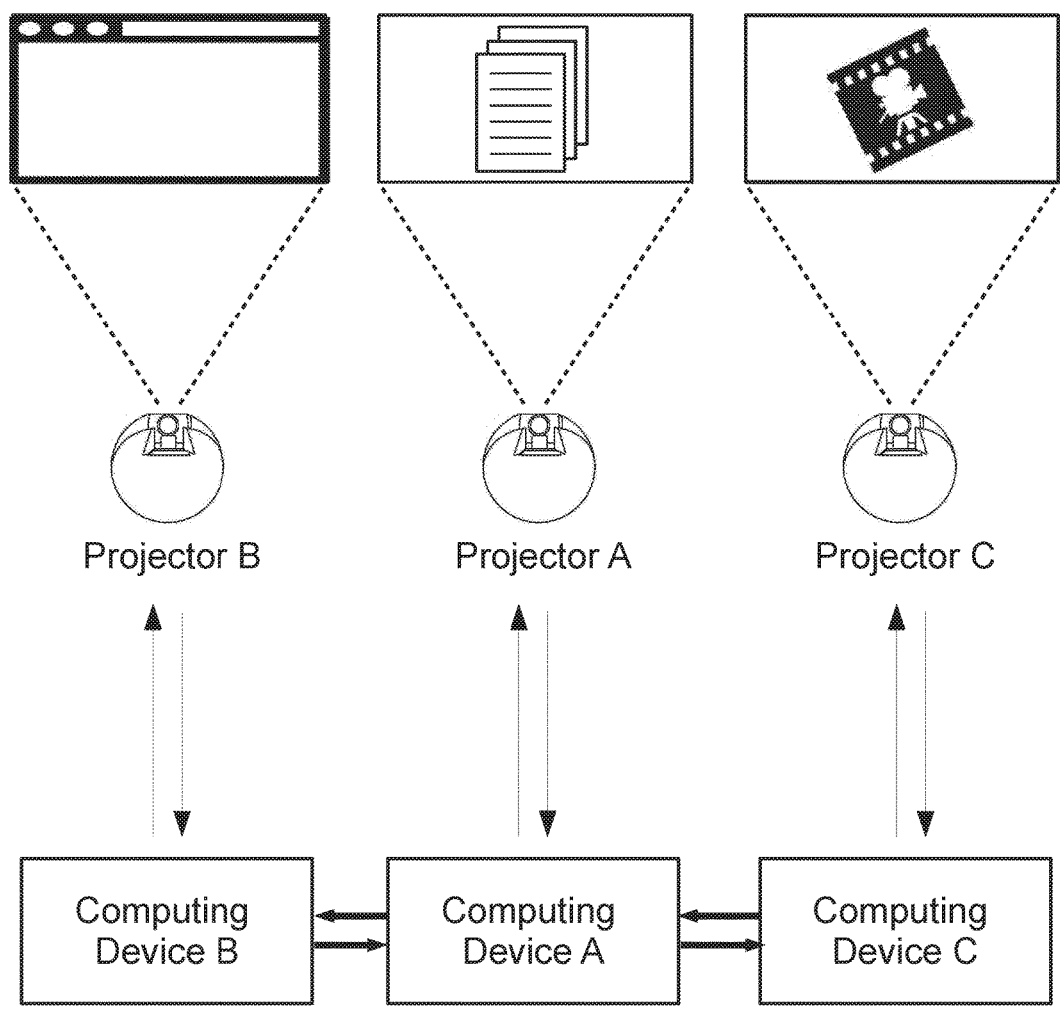
FIG. 9 is a schematic drawing according to an exemplary embodiment of the present invention.

In yet another embodiment of the present disclosure, a computing device may connect to a plurality of the cameras and projectors, either directly as shown by FIG. 8, or indirectly through other computing devices as shown by FIG. 9. Instead of merging or connecting images or videos projected by other projector, projectors can be configured or programmed in a way that they project images and videos that are independent of each other, but from the same computing device or different computing devices but controlled by one computing device. For instance, projector A will display a word document, while projector B displays a web browser and projector C displays a movie. Thus, a user will be able to perform multi-tasks with multi-projectors or projection systems in a space (e.g., separate pictures on separate walls).

Preferably, the camera 4 is a 360-degree camera, allowing the user to capture 360-degree photo and video. In one embodiment, the user records his or her day with the 360-degree camera. When the user goes home or is in a room, the user can replay his or her day in 360-degree view using the disclosed projection system. Multiple projection systems will be required if the user wants to view the whole 360-degree image or video at the same time. This creates unique experience for the user as it allows the user to rewind his or her day, and the user can see if he or she is missing anything interesting. Note this concept can be applied on other area or field as well and is not limited to the embodiment above.

In yet another embodiment of the present disclosure, the disclosed projection system can be used to assist user with interior design of a room or office. For instance, a user may select an interior design he or she likes, or a furniture he or she wants to buy, and projects it on a wall of the room or office (or the whole room or office if multiple projection systems are used). This allows the user to preview different interior designs before making decision of which to use. The user can also see whether a particular furniture matches a particular design (e.g., wallpaper).

In yet another embodiment of the present disclosure, the camera 4 will scan the color of the wall or place where the projector 6 will project the images or videos on, then invert the color of the projection, such as a color that is opposite of the wall to maximize the display quality of the projection. For example, if the camera 4 scans and detects that the wall the projector 6 is projecting on is white, the projector 6, through the computer device 2 or an internal program, will invert the white color of the projected images or videos to black.

In yet another embodiment of the present disclosure, the disclosed system is capable of performing video chat that shows only the user but not the background to provide maximum privacy to the user participating in a video chat. To achieve this, the camera 4 will first rotate and perform a scan of a room where the user is going to participate the video chat, and then when the user begins the video chat, the computing device 2 will remove or cancel the scanned background in the video chat, showing only the user (the background can be a single-color background or a photo or image designated by the user).

In yet another embodiment of the present disclosure, the camera 4 of the disclosed system can perform a 360-degree scan of a user and turn the user into a 3D avatar in the computing device 2. The computing device 2 then accesses a clothing database that has 360-degree (or 3D) image of clothing, and allows the virtual avatar to try out for clothing selected by the user. The camera 4 can also create the virtual clothing by performing a 360-degree scan on the clothing. Alternatively, with multiple projectors, the user may also project the image of the clothing directly on the user instead.

In yet another embodiment of the present disclosure, the computing device of the disclosed projection system allows wireless streaming between devices of audio, video, device screens, and photos, together with related metadata. A user will be able to display image or video from the projector using his or her mobile device.

In yet another embodiment of the present disclosure, which can be illustrated by FIG. 9, a projection system is disclosed comprising: a plurality of computing devices, where each computing device has a communication unit, a storage unit, a power supply and a processor, and each computing device is also connected to a corresponding camera and projector. The camera is capable of recording images and videos for the corresponding computing device and the projector projects images or videos output by the corresponding computing device. The camera and the projector are being controlled by at least one motor, allowing them to rotate in at least one axial direction. The plurality of computing devices is connected to each other, through wire or wirelessly, and is configured in a way that one computing device receives inputs from a user and controls other computing devices. When the projector of a first computing device projects an image or video on a wall of a room, the camera of a second computing device will rotate and scan the room for the image or the video projected by the first computing device, and then, depending on the user's requirement or input, the second computing device can project images and videos adjacent to or on top of the images and videos projected by the first computing device, or projects images and videos that merge with the images and videos projected by the first computing device. The plurality of computing devices will need to have access to a same file database for that to occur. Like above, the projector and the camera can physically attach to and communicate with each computing device through a socket or detached from each computing device and communicate with each computing device wirelessly. The main computing device may receive inputs and commands from a user via wired or wireless keyboard, mouse, joystick or a combination thereof. Alternatively, instead of having a plurality of computing devices, there can simply be one computing device that connects to plurality of cameras and projectors, and performs the same functions mentioned above as shown by FIG. 8.

Similarly, the camera from each computing device (or without computing device) can track images or videos projected by another computing device or projector (i.e., without computing device), and then projects identical images or videos on top of the images or videos projected by another computing device or projector to enhance brightness or contrast of the images or videos projected by another computing device or projector, thereby increasing the brightness and contrast of an image or video without increasing the light output of the projector. Similarly, to achieve this, the plurality of computing devices will need to have access to the same file, image or video database.

Instead of merging or connecting images or videos projected by different computing device or projectors, projectors from different computing devices or from same computing device (if there is only one computing device) can be configured in a way that they project images and videos that are independent of each other, but from same computing device or different computing devices but controlled by one computing device. For instance, projector A will display a word document, while projector B displays a web browser and projector C displays a movie. Thus, a user with multiple projection systems of the present disclosure will be able to perform multi-tasks with multi-projections in a space (e.g., separate pictures on separate walls).

In yet another embodiment of the present disclosure, a projection system is disclosed comprising: a computing device that has at least a communication unit, a storage unit, a power supply and a processor; a camera that is capable of recording images and videos for the computing device, and searching for images and videos projected by another projector; and a projector that projects images or videos output by the computer device. The projector and the camera can physically attach to and communicate with the computing device through a socket (e.g., USB) or detached from the computing device and communicate with the computing device wirelessly (e.g., LTE, Wi-Fi and Bluetooth etc.). The projector and/or the camera can be manually adjusted by the user where the computing device may provide user with instruction on where to project the image. The computing device may receive inputs and commands from a user via wired or wireless keyboard, mouse, joystick or a combination thereof. The computing device further includes a speaker or sound output (i.e., audio jack).

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

What is claimed is:

1. A projection system comprising:
   a camera that records images and videos, and sends the recorded images and videos to a computing device;
   a projector that projects output images or videos received from the computing device;
   a rechargeable battery that provides power to the camera and the projector;
   a communication unit that establishes connections between the camera, the projector and the computing device;
   at least one motor that rotates the camera and the projector in at least one axial direction; and
   wherein the camera rotates and searches for images and videos projected by another projector, and the projector then projects images and videos adjacent to or on top of the images and videos projected by another projector, or projects images and videos that merge with the images and videos projected by another projector.

2. The projection system of claim 1 further comprises a storage unit that stores images or videos taken by the camera.

3. The projection system of claim 1, wherein the camera and the projector are detachable to the computing device, and the computing device provides power to the camera, the projector and the battery when the camera and the projector are attached to the computing device.

4. The projection system of claim 1, wherein the at least one motor comprises two servo motors, one rotates horizontally and one rotates vertically relative to each other, enabling the camera to rotate in all directions.

5. The projection system of claim 1, wherein the computing device comprises a power supply, a processor, a communication unit and a storage unit, and receives inputs from a user.

6. A projection system comprising:
   a computing device comprising a communication unit, a storage unit, a power supply and a processor;
   a camera that is capable of recording images and videos for the computing device, and searching for images and videos projected by another projector;
   a projector that projects images or videos output by the computer device;
   wherein the projector and the camera can attach to and communicate with the computing device through a socket, or detached from the computing device and communicate with the computing device wirelessly;
   wherein the camera and the projector are located on two servo motors, one rotates horizontally and one rotates vertically, enabling the camera and the projector to rotate in all directions; and
   wherein the camera rotates and searches for images and videos projected by another projector, and the projector then projects images and videos adjacent to or on top of the images and videos projected by another projector, or projects images and videos that merge with the images and videos projected by another projector.

7. The projection system of claim 6, wherein the camera is attached to the projector and forms a spherical shape, and is detachable from the projector.

8. The projection system of claim 6 further comprises a casing the encloses the computing device and holds the camera and the projector.

9. The projection system of claim 6, wherein the camera and the projector receive power from the computer device when the camera and projector are attached to the computing device, and the camera and the projector utilize their own power source when they are detached from the computing device.

10. The projection system of claim 6, wherein the camera tracks images or videos projected by another projector, and the projector projects identical images or videos on top of the images or videos projected by another projector to enhance brightness or contrast of the images or videos projected by another projector.

11. The projection system of claim 6, wherein the camera further comprises a battery that supplies power to the camera when the camera is detached from the computing device and the battery is being charged when the camera is attached to the computing device.

12. The projection system of claim 6, wherein the projector projects live images or videos captured from a camera of another projection system in a space to recreate the scenery captured by the camera of another projection system in same orientation.

13. The projection system of claim 6, wherein the camera takes 360 degree images.

14. The projection system of claim 6, wherein the computing device further comprises a speaker.

15. The projection system of claim 6, wherein the computing device receives inputs from a user via wireless keyboard, a wireless mouse, a wireless joystick or a combination thereof.

16. A projection system comprising:
a computing device comprising a communication unit, a storage unit, a power supply and a processor;
a camera that is capable of recording images and videos for the computing device, and searching for images and videos projected by another projector;
a projector that projects images or videos output by the computer device;
wherein the projector and the camera can attach to and communicate with the computing device through a socket, or detached from the computing device and communicate with the computing device wirelessly;
a casing the encloses the computing device and holds the camera and the projector;
wherein the camera and the projector are located on two servo motors, one rotates horizontally and one rotates vertically, enabling the camera and the projector to rotate in all directions;
wherein the camera rotates and searches for images and videos projected by another projector, and the projector then projects images and videos adjacent to or on top of the images and videos projected by another projector, or projects images and videos that merge with the images and videos projected by another projector; and
wherein the camera and the projector receive power from the computer device when the camera and projector are attached to the computing device, and the camera and the projector utilize their own power source when they are detached from the computing device.

17. The projection system of claim 16, wherein the camera is attached to the projector and forms a spherical shape, and is detachable from the projector.

18. The projection system of claim 16, wherein the camera tracks images or videos projected by another projector, and the projector projects identical images or videos on top of the images or videos projected by another projector to enhance brightness or contrast of the images or videos projected by another projector.

19. The projection system of claim 16, wherein the projector projects live images or videos captured from a camera of another projection system in a space to recreate the scenery captured by the camera of another projection system in same orientation.

20. The projection system of claim 16, wherein the computing device receives inputs from a user via wireless keyboard, a wireless mouse, a wireless joystick or a combination thereof.

* * * * *